June 17, 1969  H. E. KLOPFER  3,450,906
ABLATIVE MAGNETOHYDRODYNAMIC DUCT
Filed May 22, 1967
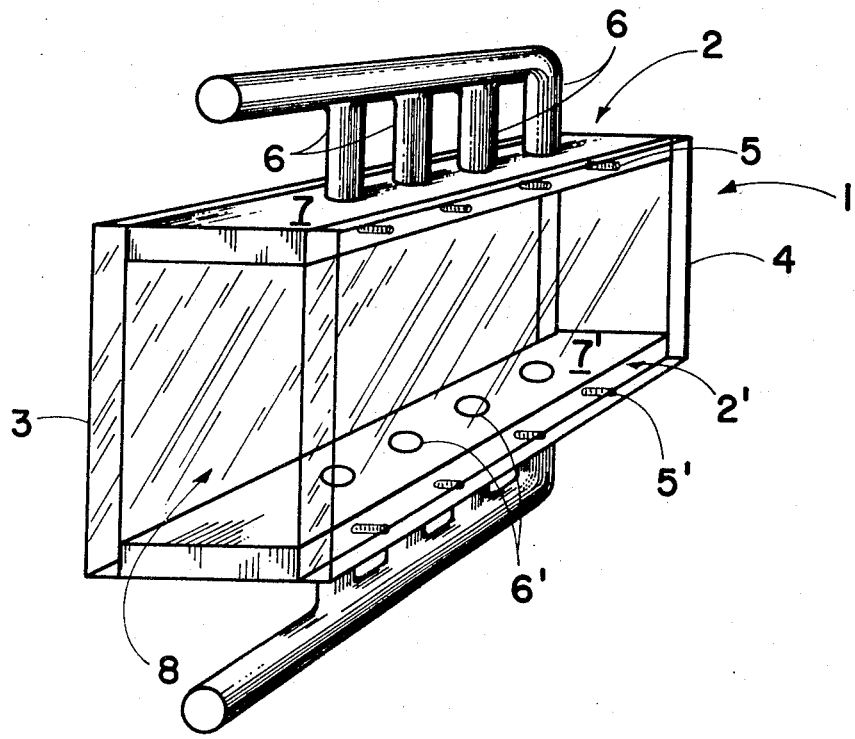
HENRY E. KLOPFER
*INVENTOR.*
BY *Steven F. Stone*
ATTORNEY

3,450,906
ABLATIVE MAGNETOHYDRODYNAMIC DUCT
Henry E. Klopfer, Sunnyvale, Calif., assignor to United Aircraft Corporation, East Hartford, Conn., a corporation of Delaware
Filed May 22, 1967, Ser. No. 640,076
Int. Cl. H02k 45/00
U.S. Cl. 310—11         4 Claims

ABSTRACT OF THE DISCLOSURE

A duct for the magnetohydrodynamic generation of electricity comprising electrode assemblies spaced apart by electrically insulating ablative walls of polymethylmethacrylate.

---

It has been proposed to generate electricity from ionized gases by causing a stream of ionized gas to flow through a magnetic field and across spaced electrodes. Various systems are known to the art and one such system employing a rocket motor as the source of ionized gas is described in copending coassigned patent application of Allen L. Holzman and John J. Allport, Ser. No. 402,246, filed Oct. 7, 1964, for Solid Grain. Ducts are generally provided through which the high temperature, high velocity ionized gas stream is caused to flow which ducts comprise spaced electrode assemblies separated by a heat resistant, electrically insulating, magnetically permeable wall structure. These wall structures have been made from various refractory materials such as boron nitride, alumina, and zirconia, however, it has been found that such materials tend to crack under the thermal stresses encountered; break up under shock waves generated in the high velocity gas stream; and tend to become conductive at high temperatures.

It has also been discovered that thin films of carbon can deposit on the surface of the walls if the ionized gases are generated by a slightly fuel-rich combustion process and these films render the walls conductive. Once these films have been formed they are almost impossible to remove. According to this invention, it has been found that the above difficulties can be overcome if the walls are fabricated from a substantially halogen free polymeric material characterized by being an electrical insulator which ablates in a char free manner under the action of high temperature gases. Polymethylmethacrylate has been found to possess these characteristics and is preferred according to this invention. This material is an electrical insulator, exhibits resistance to thermal and sonic shock and ablates fairly evenly. The char free ablative characteristic prevents any permanent build-up of conductive films on the insulator. For example, it has been noted that during a firing the walls are transparent and upon shutdown, a film of carbon renders the walls opaque. However, upon restart, the walls return to transparency almost immediately.

Accordingly, it is an object of this invention to provide an electrically insulating, char free ablative wall structure for an MHD duct.

It is another object of this invention to employ as an insulating wall structure for an MHD duct, a structure formed from polymethylmethacrylate. These and other objects of this invention will be readily apparent from the following description with reference to the accompanying drawing wherein the figure is an isometric view of an MHD duct according to this invention.

Referring now to the figure, an MHD duct 1 comprises a pair of spaced electrode assemblies 2, supported on polymethylmethacrylate walls 3 and 4 by fastening means 5, thereby defining a passage 8 through which ionized gases may be caused to flow. To eliminate leakage, a coating of a castable ceramic or a zinc chromate putty may be provided on the contact area between walls 3 and 4 and electrode assemblies 2 and 2'. Particular configuration of the electrode assembly is not critical and many configurations are known to the art. For purpose of illustration the electrode assemblies 2 and 2' are shown as comprising a plurality of electrical conductors 6 and 6', which are preferably made of tungsten or other refractory metal, extending through supports 7 and 7' in such a manner that the surfaces of the electrodes 6 and 6' are exposed to the ionized gas within passage 8. The support 7 may be of any heat resistant material such as transite, alumina, or zirconia. Since the electrodes 6 become extremely hot in operation, it is not practical to form the support 7 from polymethylmethacrylate since the electrodes will cause melting thereof at the contact points. However, if the electrodes are surrounded with sufficient thermal insulation to prevent melting of the polymethylmethacrylate the support 7 can also be fabricated from polymethylmethacrylate.

In operation, the duct 1 would be placed between the pole pieces of a magnet so that a magnetic field would be established across passage 8 and perpendicular to walls 3. Ionized gases from any suitable source would be caused to flow through passage 8 at high velocity thereby generating an EMF between electrodes 6 and 6', which would be connected to an external load (not shown). Duct 1 may be provided, if desired, with integral mounting means for connecting to the source of ionized gas and the duct and electrodes may have a configuration different from that shown.

While this invention has been described with respect to a specific embodiment thereof, it should not be construed as limited thereto. Various modifications will suggest themselves to workers skilled in the art which can be made without departing from the scope of this invention which is limited only by the following claims wherein I claim:

1. A duct for the magnetohydrodynamic generation of electricity by passage of an ionized gas stream therethrough comprising electrically insulating walls separating spaced electrodes, said electrically insulating walls comprising a halogen free polymeric material which ablates in a char free manner under the action of said ionized gas stream.

2. The duct of claim 1 wherein said polymeric material is polymethylmethacrylate.

3. In a method for generating electricity by passing an ionized gas stream at high velocity through a duct comprising spaced electrodes separated by electrical insulating means the improvement which comprises ablating said electrical insulating means in a char free manner with said ionized gases.

4. The method of claim 3 wherein said electrical insulating means are comprised of polymethylmethacrylate.

References Cited

UNITED STATES PATENTS

| | | | |
|---|---|---|---|
| 2,157,815 | 5/1939 | Boyer | 337—279 |
| 3,137,998 | 6/1964 | Beam | 60—35.6 |
| 3,206,330 | 9/1965 | Chottner | 117—218 |
| 3,210,233 | 10/1965 | Kummer et al. | 161—68 |
| 3,219,852 | 11/1965 | Brill | 310—11 |
| 3,244,564 | 4/1966 | Fox | 136—86 |
| 3,259,767 | 7/1966 | Way et al. | 310—11 |
| 3,287,590 | 11/1966 | André | 313—220 X |
| 3,362,852 | 1/1968 | Corren et al. | 136—86 |

MILTON O. HIRSHFIELD, *Primary Examiner.*
D. F. DUGGAN, *Assistant Examiner.*